(No Model.)

W. H. LARMAN.
DISINTEGRATING ROLLER.

No. 485,283.        Patented Nov. 1, 1892.

Witnesses.
E Byrne Gilchrist
[signature]

Inventor.
Wm H. Larman
By [signature]
his Attorneys

UNITED STATES PATENT OFFICE.

WILLIAM H. LARMAN, OF SLIGO, MARYLAND, ASSIGNOR TO J. W. PENFIELD & SON, OF WILLOUGHBY, OHIO.

DISINTEGRATING-ROLLER.

SPECIFICATION forming part of Letters Patent No. 485,283, dated November 1, 1892.

Application filed February 13, 1892. Serial No. 421,426. (No model.)

*To all whom it may concern:*

Be it known that I, WILLIAM H. LARMAN, of Sligo, in the county of Montgomery and State of Maryland, have invented certain new and useful Improvements in Disintegrating-Rollers; and I do hereby declare the following to be a full, clear, and exact description of the invention, such as will enable others skilled in the art to which it pertains to make and use the same.

My invention relates to improvements in pulverizing or disintegrating rollers.

Rollers have heretofore been made with longitudinal peripheral grooves with disintegrating-bars secured within such grooves; but said grooves were cut or planed in a planing-machine and holes had to be drilled from the periphery of the roller to said grooves for the insertion of the bolts for securing said disintegrating-bars in place. Such construction was objectionable in that the securing-bolts would not infrequently become loose and the planing of the grooves and drilling of holes aforesaid not only rendered the rollers comparatively expensive, but in order to make such planing of grooves and drilling of holes practicable the roller necessarily had to be made of soft metal, rendering the roller at best but short-lived.

To overcome the objectionable features just enumerated, I have devised the improved construction of disintegrating-roller hereinafter described, and pointed out in the claims.

Figure 1:
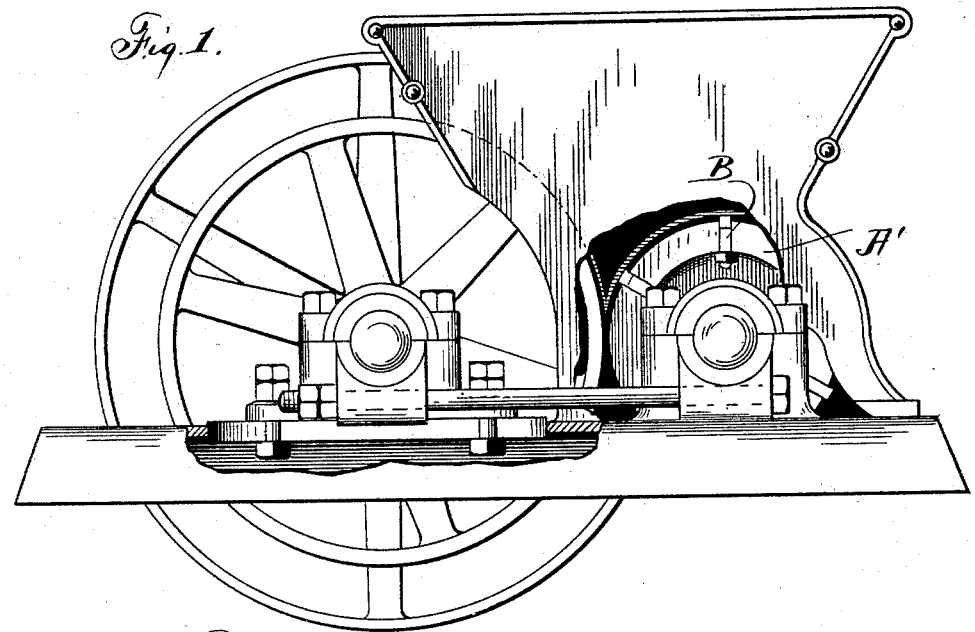
Figure 3:
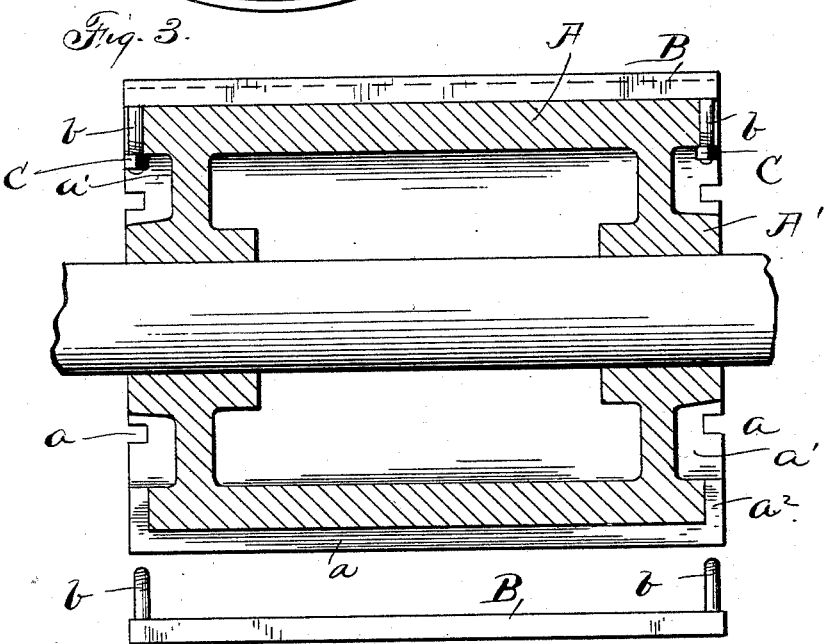
Figure 2:
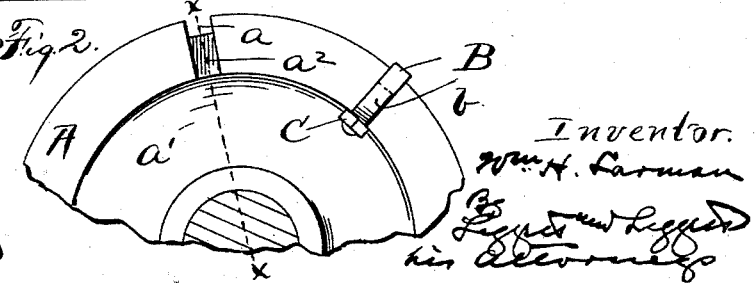

In the accompanying drawings, Figure 1 is a side elevation of a disintegrating-machine having my improved disintegrating-roller, a part of the casing being broken away to show the roller in position therein. Fig. 2 is a partial end elevation of the roller; and Fig. 3 is a central longitudinal section of the same on line $x\,x$, Fig. 2, the larger portion of the roller being broken away in Fig. 2 to reduce the size of the figure.

A preferable construction of roller is as follows, and comprises a cylindrical shell A, closed at the ends, as at A′, the latter, however, being perforated for mounting the roller upon a shaft. The roller A is cast in a mold or chill suitable for the purpose. The entire external surface of the roller is chilled or hardened. The roller is provided with longitudinal peripheral grooves $a$, extending from end to end of the roller, and the roller at either end has an annular groove or recess $a'$, the latter being connected with said peripheral grooves by radial grooves $a^2$. Grooves $a$ $a'$ $a^2$ are all "cast in," with the walls thereof chilled or hardened.

B represents metallic bars, preferably of steel, said bars fitting nicely within longitudinal grooves $a$ in the periphery of the roller. Bars B are of such width as to project the required distance beyond the periphery of the roller, and at either end are provided with an arm $b$, extending through the respective groove or recess $a^2$ into annular groove or recess $a'$. Arms $b$, at their free ends that project into annular groove or recess $a'$, are screw-threaded for receiving a nut C. By such construction bars B can be conveniently secured to the roller and when secured in place there is no liability of their becoming loose.

Instead of making the body of the roller of a single casting, as shown, the same might be made in cylindrical sections fitted together, and in constructing a sectional roller of course each section would be cast separately with longitudinal peripheral grooves cast in and extending from end to end of the sections, and the arrangement of the peripheral grooves of the respective sections would of course be such that when the sections were fitted together the grooves of a section would register with the grooves of the contiguous sections.

By the construction hereinbefore described it will be observed that no planing of grooves or drilling of holes is required. The roller has a hard external surface, and consequently possesses great durability. The disintegrating-bars can be easily removed when worn out and new bars inserted.

I desire to have it understood that my invention comprises, broadly, a disintegrating-roller, the body whereof consists of a single casting or two or more cylindrical castings fitted together with the grooves for receiving the disintegrating-bars cast in.

What I claim is—

1. A disintegrating-roller having a chilled or hardened external surface and disintegrating-bars secured in the periphery and extending from end to end of the roller and having inwardly-projecting portions extending through the outer shell of the roller, substantially as and for the purpose set forth.

2. A disintegrating-roller having longitudinal peripheral grooves and grooves in the ends of the roller in open communication with said longitudinal grooves, metallic bars seated within said longitudinal grooves, said bars at either end terminating in arms extending into the grooves in the ends of the roller, and suitable means for locking said bars in place, substantially as set forth.

3. A disintegrating-roller having a chilled or hardened external surface, longitudinal peripheral grooves, and grooves or recesses in the ends of the roller in open communication with said longitudinal peripheral grooves, said grooves or recesses being all cast in, and disintegrating-bars secured within said grooves, substantially as and for the purpose set forth.

4. A disintegrating-roller having a chilled or hardened external surface, longitudinal peripheral grooves, an annular groove or recess in the respective ends of the roller, and grooves connecting said annular grooves or recesses with the aforesaid longitudinal peripheral grooves, and disintegrating-bars secured within said grooves, substantially as and for the purpose set forth.

5. A disintegrating-roller having a chilled or hardened external surface, longitudinal peripheral grooves, and an annular groove or recess in the respective ends of the roller and in open communication with said longitudinal peripheral grooves, and metallic disintegrating-bars seated within said longitudinal peripheral grooves, said disintegrating-bars at either end being provided with an arm extending into the annular groove or recess in the respective end of the roller, the free ends of said arms being screw-threaded and having a nut mounted thereon, respectively, substantially as and for the purpose set forth.

6. A disintegrating-roller comprising an externally chilled or hardened cylindrical shell closed at its ends, the ends of the roller being centrally perforated and having each an annular groove or recess, substantially as indicated, the roller having longitudinal peripheral grooves in open communication with the annular grooves or recesses aforesaid and having metallic disintegrating-bars seated within said longitudinal grooves, said disintegrating-bars at either end terminating in an arm projecting into the annular groove or recess in the respective end of the roller, and suitable means connected with said arms for locking the disintegrating-bars in place, substantially as set forth.

In testimony whereof I sign this specification, in the presence of two witnesses, this 22d day of December, 1891.

WILLIAM H. LARMAN.

Witnesses:
GEO. L. CLARK,
FRED E. TASKER.